3,801,710
METHODS AND COMPOSITIONS FOR IMPROVING FEED EFFICIENCY OF RUMINANTS USING HALOALDEHYDE SULFONATES AND PHOSPHONATES
Roger C. Parish, King of Prussia, and John E. Trei, West Chester, Pa., assignors to Smithkline Corporation, Philadelphia, Pa.
No Drawing. Continuation-in-part of abandoned application Ser. No. 881,868, Dec. 3, 1969. This application May 31, 1972, Ser. No. 258,254
Int. Cl. A23h 1/18
U.S. Cl. 424—222
10 Claims

ABSTRACT OF THE DISCLOSURE

Certain haloaldehyde sulfonates and phosphonates when ingested admixed in the feed of ruminants in doses which have no therapeutic or toxic properties and which do not inhibit overall fermentation of the rumen improve the feed efficiency of the ruminant diet significantly. The chemical compounds are added to the feed as a uniform additive, used as a premix combined with an edible carrier or dispersed in salt blocks for pasture feeding. Preferred and exemplary compounds to be used as active ingredients are sodium 2,2,2-trichloro-1-hydroxyethane sulfonate, dimethyl 2,2,2-trichloro-1-hydroxyethyl phosphonate and their O-lower alkanoyl derivatives.

---

This application is a continuation-in-part of copending Ser. No. 881,868 filed Dec. 3, 1969 now abandoned.

This invention relates to new compositions and methods for improving the feed efficiency of ruminant animals such as cattle, sheep, goats, etc., using as active ingredients certain haloaldehyde sulfonates and phosphonates, for example those of the following formula:

(I) 

in which:

X is hydrogen or halo, especially chloro and bromo, alternatively the polyhalomethane moiety (—CX$_3$) may be replaced with a polyhaloethyl or polyhalopropyl such as 1,1,2-trichloropropyl or 1,2-dichloroethyl, X always being at least 2 halo atoms;

R is acyl preferably lower alkanoyl of from 2–6 carbon atoms or preferably hydrogen;

Z is SO$_3$M or PO(OR$_1$)$_2$;

M is an alkali or alkali earth metal such as sodium or potassium;

R$_1$ is lower alkyl of not more than 6 carbon atoms or, when both R$_1$ moieties are taken together, lower alkylene of 2–5 carbons.

The amounts of these active ingredients contained in these new feed compositions and methods of improving the feed efficiency of ruminants will vary over the generic class of active ingredients but will be chosen to be effective for example as demonstrated in various antimethanogenesis tests but not toxic, noxious or therapeutic in an acute medical sense. This aspect of the invention will be detailed later.

To our knowledge, the activity of these active phosphites and sulfites is novel. German application No. 19 65 920 published June 24, 1971, discloses the use of combinations including cholinergic compounds to fatten animals including O,O-dimethyl-(1-hydroxy-2,2,2-trichloroethyl)phosphonate. U.S. Pat. No. 3,608,087 discloses certain sulfonamides and phosphonic acid derivatives to have activity as ruminant feed supplements but these compounds are distinguished structurally from those claimed here as active ingredients and are prepared by relatively expensive chemical methods. This latter fact is a most important consideration.

The active ingredients of this invention are old compounds which are easily prepared by chemical methods readily available to those skilled in the art. For example the compounds of Formula I in which R is hydrogen are prepared by reaction of a known polyhaloaldehyde with either a known metal bisulfite, a dialkylphosphite or a cyclicalkylene phosphite. See for example Chemical Abstracts 54, 1571; Chemical Abstracts 53, 37; Beilstein 1, 623 for synthetic methods. The O-acyl derivatives, those in which R is acyl, are most conveniently prepared by direct O-acylation or by reaction of the polyhaloaldehyde with an acyl halide then reaction with phosphite. See Chemical Abstracts 54, 4393.

Examples of preferred compounds to be used as active ingredients are the following:

sodium 2,2,2-trichloro-1-hydroxyethane sulfonate,
dimethyl 2,2,2-trichloro-1-hydroxyethyl phosphonate,
dimethyl 2,2,2-trichloro-1-acetoxyethyl phosphonate,
dimethyl 2,2,2-trichloro-1-butyryloxyethyl phosphonate,
potassium 2,2,2-tribromo-1-hydroxyethane sulfonate,
sodium 2,2-dichloro-1-hydroxyethane sulfonate,
dimethyl 2,2-dibromo-1-hydroxyethyl phosphonate,
(2,2-dimethyl-1,3-propylene)-2,2,2-trichloro-1-hydroxyethyl phosphonate,
ethylene 2,2,2-trichloro-1-hydroxyethyl phosphonate,
sodium 2,2,3-trichloro-1-hydroxybutyl sulfonate,
1,2-propylene-2,2-dibromo-1-hydroxyethyl phosphonate.

The ruminant feeds most generally used in conjunction with the method of this invention are the roughage feeds such as hay, silage or various commercial grain mixtures commonly used in ruminant animals, that is, in cattle or sheep. The amount of additive here will be an amount sufficient to improve the feed efficiency of the animal but not have a pharmacodynamic or therapeutic effect; in the range of about 1 g. to 1 kg. per ton (about 0.001–0.1%) preferably from about 50–400 g. per ton of polyhaloacetaldehyde equivalent. An average 80 lb. sheep will ingest about 3–4 lbs. of food daily; cattle up to about 25 lbs. of dry matter. The upper limits of the broad range disclosed here are most useful in cattle.

For commercial use, the active ingredients are most readily used as premix formulations in which the chemical is distributed uniformly throughout a standard animal feed carrier. This premix or concentrate is then mixed with either a normal or a special fattening diet of the ruminant as desired. Examples of such carriers are soybean meal, corn oil, ground corn, barley, wheat, mineral mixtures such as vermiculites, diatomaceous earth, corn gluten meal, corn distillers solubles or soyflour. The active ingredient will be in amounts to satisfy the criteria set forth above for whole feed. The active ingredient will usually be present in from 5–75% by weight of the premix compositions.

The whole animal feeds themselves may also contain cellulosic roughage such as cellulose, hay, straw, corn stalks, oats, barley, and cereal brans; natural oils such as animal fats, fish oils, and whale oil; vegetable oils such as soybean oil, olive oil, safflower oil, peanut oil, and cottonseed oil; antioxidants; minerals; vitamins; antibiotics; anthelmintics; and other appropriate medicaments.

A typical prepared animal feed is as follows:

| | | |
|---|---|---|
| Mix hay | percent | 40.0 |
| Ground yellow corn | do | 45.0 |
| Soybean oil meal | do | 7.0 |
| Cane molasses | do | 7.0 |
| Dicalcium phosphate | do | 0.5 |
| Trace minerals salt | do | .5 |
| Vitamin A | I.U./lb | 300 |
| Vitamin D | I.U./lb | 150 |
| Sodium 2,2,2-trichloro-1-hydroxyethane sulfonate | g./ton of feed | 400 |

An example of a suitable premix is as follows:

| | |
|---|---|
| Chloral hydrate | 200 g. |
| Ground yellow corn | To 5 lbs. |

This mix is added to a ton of feed.

Another is a 50–50 mixture of dimethyl 2,2,2-trichloro-1-hydroxyethyl phosphonate and vermiculite.

In the field the active ingredients may be administered by means of salt or molasses blocks. A typical block may be prepared using the following proportions:

| Ingredient: | Weight percent |
|---|---|
| Dried cane molasses | 44.54 |
| Ground soybean hulls | 19.90 |
| Sodium 2,2,3-trichloro-1-hydroxybutyl sulfonate | 10.00 |
| Granulated salt | 21.59 |
| Trace minerals and vitamins | 0.20 |
| Stabilized animal fat | 1.11 |
| Moisture | 2.66 |

The method of this invention comprises allowing the catle or sheep to feed adlibitum on the supplemental rations or to be restricted fed on pasture or under feed lot conditions.

As examples of the typical animal an 80 lb. sheep may ingest from about 0.1–1 g. of a polyhaloacetaldehyde sulfonate or phosphonate per day while in a 1000 lb. cow may ingest from about 1–4 g. of a polyhaloacetaldehyde sulfonate or phosphonate per day. In the above noted amounts and ratios generically described herein the quantities are based on the respective haloacetaldehyde. The absolute amount of the active ingredient is calculated from the haloacetaldehyde on a weight equivalent basis. When amounts are given for a specific compound, they refer to absolute quantities. As noted above the polyhaloacetaldehyde derived chemical compounds are preferred, especially those derived from di- or tri-bromo or chloroacetaldehydes.

Normally increased feed efficiency is realized from using the methods and compositions of this invention on rough fodder or normal grain feeding. However, we have found feed efficiency increases of from about 5–15% using normal fattening diets and pen conditions.

The ability of the polyhalo derivatives of this invention to improve feed utilization in ruminants is primarily evaluated by means of a test which measures inhibition of in vitro methane gas production, total gas and VFA production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3–4 hours. Test compound may be added as such or, particularly when used in quantities as small as 10 p.p.m. or less, suspended or dissolved in a solvent such as water or ethanol. At the end of the test period, the trapped gases are collected by hypodermic needle from the flask and run through a gas partitioner (column chromatography) which separates and quantitates the components. The liquids (volatile fatty acids, etc.) are analyzed by gas liquid chromatography. Among the products measured are carbon dioxide, methane, and fatty acids having from 2 to 6 carbon atoms. Reduction in the percent methane produced of 20% is considered significant. However, with compounds used in the present invention, reduction of 90–100% is not uncommon. Ability of a particular compound to reduce the amount of methane generated without adversely reducing the overall rate of fermentation is determined by comparing the total ($\mu$ moles/ml.) volatile fatty acids produced in control systems with those containing test compound. Also significant is the distribution of fatty acids obtained. A shift from acetate toward the higher molecular weight volatile fatty acids is considered favorable.

The effect of the polyhaloacetaldehyde sulfonates and phosphonates of this invention in reducing methane production without causing a significant reduction in the rate of overall fermentation at effective concentrations, when tested by the above procedures, is shown by the data below.

A predetermined molar or percent concentration of test compound in water or ethanol was administered usually in 0.1, 0.5 or 1.0 cc. portions as described above. The data in Table I is for parts of the active ingredient per amount of rumen fluid, i.e., parts per million with resulting significant methane inhibition.

TABLE I

| Compound | P.p.m | Percent methane reduction |
|---|---|---|
| $CCl_3-CH(OH)-SO_3Na$ | 13 | 85 |
| $CH_3-CHCl-CCl_2-CH(OH)-SO_3Na$ | 13 | 90 |
| $CCl_3-CH(OH)-P(O)(O-CH_2)_2C(CH_3)_2$ | 13 | 85 |
| $CCl_3-CH[P(O)(OCH_3)_2](O-CO-CH_2CH_2CH_3)$ | 13 | 85 |
| $CCl_3-CH(OH)-P(O)(OCH_3)_2$ | 13 | 85 |

The in vitro data presented above was confirmed by in vivo tests as follows.

Rumen cannulated sheep were fed ad lib a corn-soy-molasses diet. After a baseline was established, drug was administered via cannula, 0.5 g. twice a day. Samples of rumen gas and fluid were removed twice daily for three days. Figures shown are a three day average.

TABLE II

Rumen metabolite levels of sheep

| | Control | Treated |
|---|---|---|
| (A) Sodium 2,2,2-trichloro-1-hydroxyethane sulfonate: | | |
| Acetate (molar percent) | 50.24 | 38.9 |
| Propionate (molar percent) | 36.40 | 39.38 |
| Butyrate (molar percent) | 10.24 | 16.05 |
| Valerate (molar percent) | 2.51 | 4.18 |
| Total VFA ($\mu$ moles/ml.) | 122.47 | 131.96 |
| $CO_2$ (volume percent) | 78.6 | 77.6 |
| $CH_4$ (volume percent) | 21.7 | 20.2 |

This data corresponding to that in the parent application at page 12, Table III (D) but is a more comprehensive experiment

| | | |
|---|---|---|
| (B) Dimethyl 2,2,2-trichloro-1-hydroxyethyl phosphonate: | | |
| Acetate (molar percent) | 48.83 | 33.92 |
| Propionate (molar percent) | 23.99 | 44.01 |
| Butyrate (molar percent) | 20.40 | 17.55 |
| Valerate (molar percent) | 6.32 | 5.65 |
| Total VFA ($\mu$ moles/ml.) | 66.10 | 74.27 |
| $CO_2$ (volume percent) | 81.7 | 67.4 |
| $CH_4$ (volume percent) | 17.5 | 0.2 |

The sought after shift in rumen metabolism in the sheep is realized in both cases.

We claim:

1. The method for improving the feed utilization of ruminant animals comprising orally administering to such animals a quantity of an active ingredient from the range of about 0.1–4 g. per day which is effective in improving the feed efficiency of the animals but which does not have a therapeutic or toxic effect, said ingredient being of the formula:

$$CX_3-\underset{\underset{OR}{|}}{CH}-Z$$

in which:
X is hydrogen, chloro, or bromo, at least two of X being chloro or bromo;
R is hydrogen or alkanoyl of 2-6 carbons;
Z is $SO_3M$ or $PO(OR_1)_2$;
M is an alkali or alkaline earth metal; and
$R_1$ is lower alkyl of 1–6 carbons or, when both $R_1$ groups are taken together, lower alkylene of 2–5 carbons.

2. The method of claim 1 in which the active ingredient is of the formula:

$$CX_3-\underset{\underset{OR}{|}}{CH}-SO_3M$$

in which:
X, M and R are as defined in claim 1.

3. The method of claim 1 in which the active ingredient is of the formula:

$$CX_3-\underset{\underset{OH}{|}}{CH}-SO_3M$$

in which M is sodium or potassium.

4. The method of claim 1 in which the active ingredient is of the formula:

$$CX_3-\underset{\underset{OH}{|}}{CH}-PO(OR_1)_2$$

in which $R_1$ is loweralkyl of 1–6 carbons.

5. The method of claim 1 in which the active ingredient is administered in the amount of from about 1 g. to 1 kg. per ton of feed.

6. The method of claim 2 in which the active ingredient is administered in the amount of from about 50–400 g. per ton of feed.

7. A ruminant animal feed having increased feed efficiency comprising a basal animal feed supplemented by a quantity of an ingredient which is active in increasing feed efficiency but nontoxic from the range of from about 1 g. to 1 kg. per ton of feed and which is of the formula:

$$CX_3-\underset{\underset{OR}{|}}{CH}-Z$$

in which:
X is hydrogen, chloro, or bromo, at least two of X being chloro or bromo;
R is hydrogen or alkanoyl of 2–6 carbons;
Z is $SO_3M$ or $PO(OR_1)_2$;
M is an alkali or alkaline earth metal; and
$R_1$ is lower alkyl of 1–6 carbons or, when both $R_1$ groups are taken together, lower alkylene of 2–5 carbons.

8. The ruminant animal feed of claim 7 in which the active ingredient is of the formula:

$$CX_3-\underset{\underset{OR}{|}}{CH}-SO_3M$$

in which:
X, M and R are as defined in claim 7.

9. The ruminant animal feed of claim 7 in which the active ingredient is of the formula:

$$CX_3-\underset{\underset{OH}{|}}{CH}-PO(OR_1)_2$$

in which:
R is lower alkyl of 1–6 carbons.

10. The ruminant animal feed of claim 7 in which the quantity of active ingredient is from the range of about 50–400 g. per ton of feed.

References Cited

UNITED STATES PATENTS

| | | | |
|---|---|---|---|
| 2,701,225 | 2/1955 | Lorenz | 260—970 X |
| 2,911,435 | 11/1959 | Casida et al. | 260—970 X |
| 3,608,087 | 9/1971 | A. A. Patchett et al. | 424—320 |

FOREIGN PATENTS

| | | | |
|---|---|---|---|
| 1,965,920 | 6/1971 | Germany. | |

NORMAN YUDKOFF, Primary Examiner

K. P. VAN WYCK, Assistant Examiner

U.S. Cl. X.R.

426—807; 424—209, 311, 315